(12) United States Patent
Bhardwaj et al.

(10) Patent No.: US 10,013,416 B1
(45) Date of Patent: Jul. 3, 2018

(54) LANGUAGE BASED SOLUTION AGENT

(71) Applicant: Amazon Technologies, Inc., Seattle, WA (US)

(72) Inventors: Vikas Seshagiri Rao Bhardwaj, Seattle, WA (US); Jared Kane Kramer, Seattle, WA (US); Hung Chiu Phillip Keung, Seattle, WA (US); Kapil Chahal, Redmond, WA (US); Tarun Agarwal, Seattle, WA (US); Jason Sun, Bellevue, WA (US); Gunashekar Jayaraman, Redmond, WA (US); Dhvani Yogesh Shah, Seattle, WA (US); Ariel Grob Dos Santos, Seattle, WA (US); Sheng Bi, Bellevue, WA (US); Polly Po Yee Lee, Seattle, WA (US); Anirban Chakraborty, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/974,501

(22) Filed: Dec. 18, 2015

(51) Int. Cl.
| | |
|---|---|
| *G06F 17/27* | (2006.01) |
| *G06F 17/28* | (2006.01) |
| *H04L 29/06* | (2006.01) |
| *H04L 29/08* | (2006.01) |
| *G06N 99/00* | (2010.01) |
| *G10L 15/18* | (2013.01) |

(52) U.S. Cl.
CPC ......... *G06F 17/28* (2013.01); *G06N 99/005* (2013.01); *G10L 15/18* (2013.01); *H04L 67/02* (2013.01); *H04L 67/16* (2013.01); *H04L 67/42* (2013.01)

(58) Field of Classification Search
CPC ............ G06F 17/3086; G06F 17/2785; G06F 17/2881
USPC .......................................................... 704/9
See application file for complete search history.

(56) References Cited

U.S. PATENT DOCUMENTS

| | | | |
|---|---|---|---|
| 8,792,631 | B2 | 7/2014 | Addair |
| 9,699,207 | B2 | 7/2017 | Chapman |
| 9,800,727 | B1 | 10/2017 | Chakrabarty et al. |
| 2005/0080930 | A1 | 4/2005 | Joseph |
| 2010/0142698 | A1 | 6/2010 | Spottiswoode et al. |
| 2014/0067375 | A1 | 3/2014 | Wooters |
| 2014/0164302 | A1* | 6/2014 | Di Fabbrizio ..... G06Q 30/0631 706/46 |
| 2014/0365594 | A1 | 12/2014 | Miner et al. |
| 2015/0006632 | A1 | 1/2015 | Tomkins et al. |
| 2015/0073868 | A1 | 3/2015 | Garman |
| 2015/0348173 | A1 | 12/2015 | Gillen |

(Continued)

OTHER PUBLICATIONS

U.S. Appl. No. 15/340,022 filed Nov. 1, 2016, Non-Final Office Action dated Feb. 8, 2018.

(Continued)

*Primary Examiner* — Jakieda Jackson
(74) *Attorney, Agent, or Firm* — Thomas Horstemeyer, LLP

(57) ABSTRACT

Disclosed are various embodiments for an automated service agent. Natural language inputs are obtained from a client. The natural language inputs and other data are input to machine learning models to identify intents reflected in the natural language inputs. A state in a workflow is updated to reflect the identified intents. Responses may be communicated to the client to further progress in the workflow.

20 Claims, 4 Drawing Sheets

(56) References Cited

U.S. PATENT DOCUMENTS

| | | | |
|---|---|---|---|
| 2016/0055563 A1* | 2/2016 | Grandhi | G06Q 30/0625 |
| | | | 705/26.62 |
| 2016/0063993 A1* | 3/2016 | Dolan | G10L 15/08 |
| | | | 704/254 |
| 2016/0078512 A1* | 3/2016 | Yopp | G06Q 30/0613 |
| | | | 705/26.41 |
| 2016/0163311 A1* | 6/2016 | Crook | G10L 15/183 |
| | | | 704/275 |
| 2016/0173424 A1 | 6/2016 | Fuhrmann | |
| 2016/0173627 A1 | 6/2016 | Herling et al. | |
| 2016/0196491 A1* | 7/2016 | Chandrasekaran | G06N 5/02 |
| | | | 706/50 |
| 2016/0234245 A1 | 8/2016 | Chapman | |
| 2016/0260029 A1 | 9/2016 | Gelfenbeyn et al. | |
| 2016/0316059 A1 | 10/2016 | Nuta et al. | |
| 2016/0322044 A1 | 11/2016 | Jung et al. | |
| 2016/0379129 A1 | 12/2016 | Assem; et al. | |
| 2017/0006161 A9 | 1/2017 | Akbar | |
| 2017/0032783 A1 | 2/2017 | Lord et al. | |
| 2017/0132019 A1 | 5/2017 | Karashchuk et al. | |
| 2017/0195495 A1 | 7/2017 | Deora et al. | |

OTHER PUBLICATIONS

U.S. Appl. No. 15/234,200 filed Aug. 11, 2016, Non-Final Office Action dated Mar. 8, 2018.

* cited by examiner

US 10,013,416 B1

LANGUAGE BASED SOLUTION AGENT

BACKGROUND

Services may provide information to users through various interfaces. For example, a user may be provided a chat interface, audio interface, or other interface to access solutions or other information. Users may provide natural language inputs into the services in order to access the desired information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Services may provide various interfaces that allow users to access desired information. As an example, a service may provide a chat interface, voice interface, search interface, or other interface to access the desired information. Examples of desired information may include help articles, solutions to problems, status updates for orders or other activities, or other information. A user of these interfaces may wish to provide natural language inputs in order to access the desired information. For example, a user needing the status of a pending order may request the order status in the form of a question.

A service agent implements a language processing service to process a natural language input to determine an intent expressed in the input. The language processing service may also detect entities referenced in the input. For example, a natural language input of "I need help with my phone" may express an intent for needing assistance with a product. As another example, a natural language input of "Where is the order I placed yesterday?" references entities "order" and "yesterday," and includes an intent for an order status. The language processing service provides the detected intents and entities to a workflow service, which updates the state of a workflow to reflect the detected intents and entities. Based on the current state in the workflow, the workflow service may provide a response to the client. The response may include the requested information, or a solicitation to provide further natural language inputs to advance in the workflow. Additionally, a client may be connected with a customer service agent or other party in the event that the workflow cannot reach a solution state, or if the natural language input expresses frustration, dissatisfaction, or other sentiments.

In the following discussion, a general description of the system and its components is provided, followed by a discussion of the operation of the same.

Figure 1:
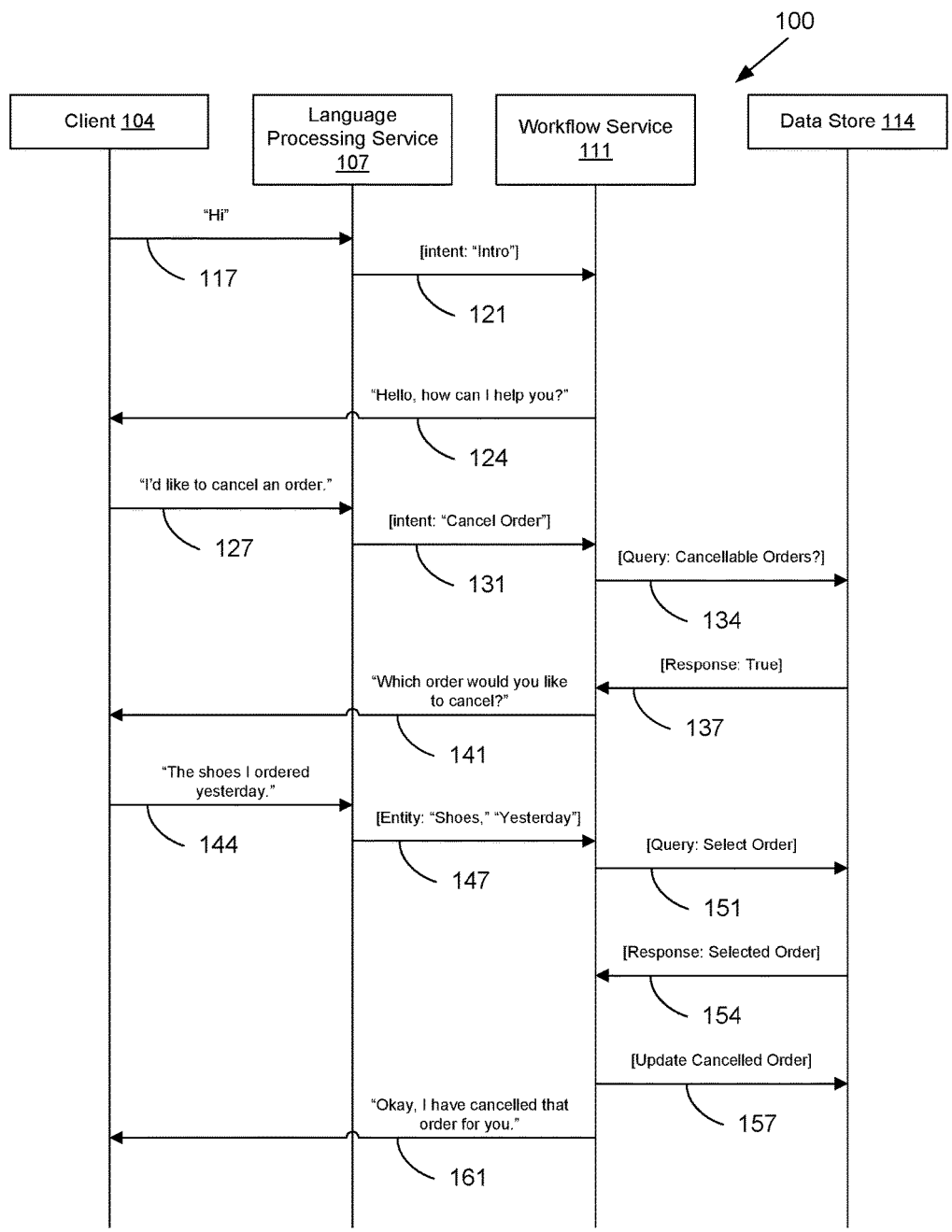
FIG. 1 is an example scenario depicting interactions between a client and a service agent according to various embodiments of the present disclosure.

With reference to FIG. 1, shown is an example scenario 100 depicting communications between a user client 104 and a service agent implementing a language processing service 107 and workflow service 111, and having access to a data store 114. Reference 117 depicts a natural language input "Hi" from the user client 104 to the language processing service 107. The language processing service 107 detects an intent of "Intro," indicating that the user of the user client 104 wishes to perform a subsequent action. This intent is forwarded to the workflow service at reference 121, where the workflow service 111 updates the current workflow state to an introductory or root state. The workflow service 111 then communicates a response of "Hello, how can I help you?" at reference 124.

After receiving the response of reference 124, the user client 104 provides a natural language input of "I'd like to cancel an order" to the language processing service 107 at reference 127. The language processing service 107 detects an intent of "Cancel Order," which it forwards to the workflow service 111 at reference 131. In response to this intent, at reference 134, the workflow service 111 queries the data store 114 to determine if there are any cancelable orders for the user of the user client 104. At reference 137, the workflow service 111 receives an indication that there are cancelable orders. The workflow service 111 then provides a response to the user client 104 at reference 141, soliciting an indication of which order should be cancelled.

In response to this solicitation, at reference 144, the user client 104 communicates a natural language input of "The shoes I ordered yesterday" to the language processing service 107, which identifies entities "Shoes" and "Yesterday." These entities are provided to the workflow service 111 at reference 147, which queries the data store 114 for a corresponding order at reference 151. The selected order is returned to the workflow service 111 at reference 154. Having access to the selected order, the workflow service 111 initiates an order cancellation at reference 157, and provides an indication to the user client 104 that the order was cancelled at reference 161.

Figure 2:
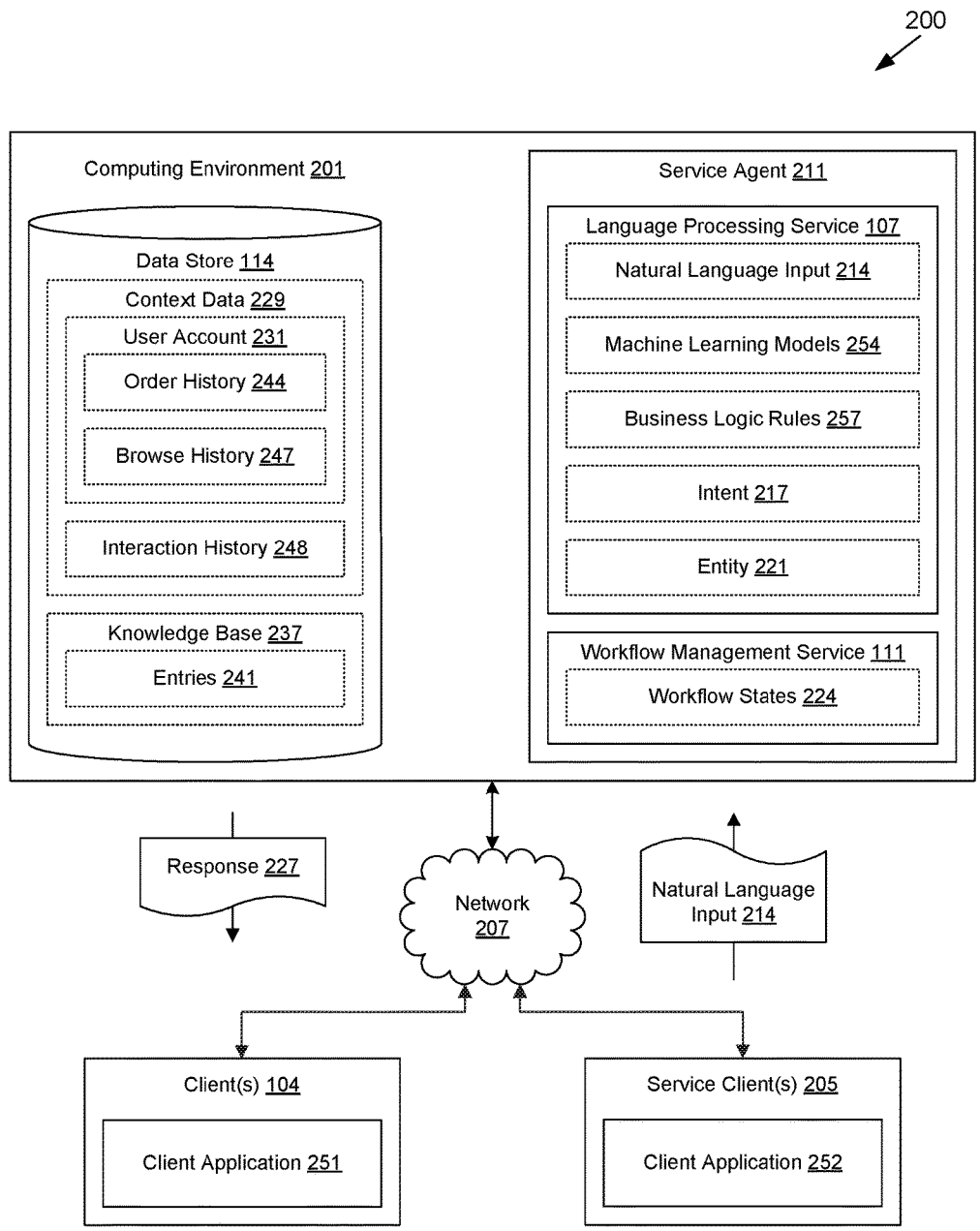
FIG. 2 is a drawing of a networked environment according to various embodiments of the present disclosure.

Turning now to FIG. 2, shown is a networked environment 200 according to various embodiments. The networked environment 200 includes a computing environment 201, a user client 104 and a service client 205, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 114 that is accessible to the computing environment 201. The data store 114 may be representative of a plurality of data stores 114 as can be appreciated. The data stored in the data store 114, for example, is associated with the operation of the various applications and/or functional entities described below.

The components executed on the computing environment 201, for example, include a service agent 211 having a language processing service 107 and workflow management service 111, and other applications, services, processes, systems, engines, or functionality not discussed in detail herein. The service agent 211 is executed to receive natural language inputs 214 from the user client 104 and implement a workflow according to the natural language inputs 214. As non-limiting examples, the service agent 211 may facilitate a workflow for providing requested information, resolving a problem, or performing other services.

To this end, the service agent 211 implements the language processing service 107 to identify intents 217 and entities 221 referenced in the natural language input 214. Intents 217 may correspond to intended actions performable by the workflow management service 111, as will be described in more detail below. Such actions may include data queries, accesses, modifications, or other actions as can be appreciated. Entities 221 correspond to references, attributes, metadata, or other information acted upon or facilitating the actions performed by the workflow management service 111. The natural language input 214 may also include other data or references beyond intents 217 and entities 221. Such supplemental data may clarify or contextualize intents 217 or entities 221, or may be extraneous data serving no further purpose.

The workflow management service 111 updates a current workflow state 224 using the intents 217 and entities 221 identified by the service agent 211, and potentially using other data. The workflow states 224 include one or more logically linked states traversable through interactions with the service agent 211. To this end, workflow states 224 may be considered nodes in a directed or undirected graph, or encoded by other approaches. In other embodiments, a workflow may be defined deterministically by applying a machine learning approach or other algorithm. For example, a user and a customer service representative may communicate using respective user clients 104 and service clients 205. The communications between the user clients 104 and service clients 205, as well as actions implemented by the service clients 205, may serve as training data for a machine learning approach, whose output would be a given workflow state 224.

The workflow states 224 may correspond to actions executed by the workflow management service 111. Such actions may include accessing or modifying data stored in the data store 114. Such actions may also include providing responses 227 to the user client 104. These responses 227 may encode data for presentation to the user client 104, solicitations for additional natural language inputs 214, or other data.

The data stored in the data store 114 includes, for example, context data 229, a knowledge base 237 of entries 241, and potentially other data. Context data 229 includes data defined to contextualize interactions with respect to the service agent 211, as well as other systems or services associated with the computing environment 201. For example, context data 229 may be defined with respect to user accounts 231, with respect to user client 104, or by another approach. User accounts 231 encapsulate data associated with one or more users of the service agent 211. User accounts 231 may comprise, for example, login information such as usernames or passwords to authenticate a user. The user accounts 231 may also comprise contact information such as a mailing address, email address, phone number or other contact information. Additionally, the user accounts 231 may comprise data representing payment instruments used to consummate a financial transaction, including credit cards, debit cards, banking accounts, prepaid accounts, or other payment instruments. User accounts 231 may also comprise user preferences embodying settings, configurations, or other preferences used in interactions with the service agent 211 or other systems. User accounts 231 may also include data embodying interactions with systems implementing or in communication with the service agent 211. For example, the user accounts 231 may include an order history 244 for an electronic commerce system, a browse history 247, or other data.

Context data 229 may also include an interaction history 248 indicating interactions with the service agent 211, or other systems or services. For example, the interaction history 248 may include past natural language inputs 214 provided to the service agent 211. The interaction history 248 may also indicate intents 217 or entities 221 extracted from the natural language inputs 214 by the language processing service 107. Additionally, the interaction history 248 may indicate progressions or transitions between workflow states 224 or workflow states 224 interacted with by a user client 104 or user account 231. The interaction history 248 may also include other data. Thus, the interaction history 248 maintains a record of workflow states 224 for future reference by the service agent 211. This can be used by the service agent 211 to preserve participation in a workflow across multiple sessions with the service agent 211, and across multiple devices or platforms used to access the service agent 211. This also allows for future interactions with the service agent 211 to reference prior interactions, and allows for past interactions to be used by the language processing service 107 to disambiguate or identify intents 217 and entities 221 in natural language inputs 214.

The knowledge base 237 encapsulates entries 241 of data accessible to or modifiable by the service agent 211. For example, the knowledge base 237 may include a searchable catalog of item entries 241. The knowledge base 237 may also include articles or other entries 241 embodying information accessible by user clients 104 through the service agent 211. The knowledge base 237 may also include other information.

The user client 104 and service client 205 are representative of a plurality of client devices that may be coupled to the network 207. The user client 104 and service client 205 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The user client 104 and service client 205 may each include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The user client 104 and service client 205 may be configured to execute various applications such as a client application 251 and client application 252, respectively, and/or other applications. The client application 251 or client application 252 may be executed in a respective user client 104 or service client 205, for example, to access network content served up by the computing environment 201 and/or other servers, thereby rendering a user interface on the display. To this end, the client application 251/252 may comprise, for example, a browser, a dedicated application, etc., and the user interface may comprise a network page, an application screen, etc. The user client 104 and service client 205 may be configured to execute applications beyond the client application 251/252 such as, for example, email applications, social networking applications, word processors, spreadsheets, and/or other applications.

Next, a general description of the operation of the various components of the networked environment 200 is provided. To begin, a user client 104 communicates a natural language input 214 to the service agent 211 via the network 207. The natural language input 214 may correspond to a text input. Accordingly, in some embodiments, the service agent 211 may encode for rendering a user interface including a text input, such as a search query input, a chat input, or other text input as can be appreciated. In other embodiments, the natural language input 214 may correspond to an audio input to the user client 104.

In some embodiments, the service agent 211 can redirect natural language inputs 214 to a search service or another service. For example, a search query input field may accept text inputs. The language processing service 107 may apply a natural language processing approach or machine learning approach to the text inputs to determine if the text inputs correspond to a natural language input 214 for processing by the service agent 211. If not, the text input may instead be forwarded to a search query service for processing as a search query.

Upon receiving the natural language input 214, the language processing service 107 of the service agent 211 processes the natural language input 214 to detect intents 217 or entities 221 included or referenced in the natural language input 214. To this end, the language processing service 107 provides the natural language input 214 as input to one or more machine learning models 254 trained to identify intents 217 or entities 221. In embodiments in which the natural language input 214 corresponds to an audio input, this may also include applying a speech-to-text algorithm to the natural language input 214 to identify words or phrases included in the natural language input 214. The words or phrases may then be provided as input to the machine learning models 254.

In some embodiments, identifying intents 217 may be facilitated by implementing two tiers of machine learning models 254. For example, a first tier of machine learning models 254 may include multiple machine learning models 254, one for each possible predefined intent 217 that may be detected in the natural language input 214. The natural language input 214 may be provided to each of these machine learning models 254 to determine whether the corresponding possible intent 217 is reflected in the natural language input 214. To this end, the output of a respective machine learning model 254 may include a binary determination of whether or not the corresponding possible intent 217 is reflected in the natural language input 214. In other embodiments, the output of a respective machine learning model 254 may include a confidence score or other evaluation indicating a likelihood that the corresponding possible intent 217 is reflected in the natural language input 214.

Under the two tier approach, the output of these machine learning models 254 may then be provided as input to another machine learning model 254 to select one or more intents 217 from the possible intents 217. The language processing service 107 may apply one or more business logic rules 257 to the outputs of the first tier of machine learning models 254 to facilitate selection of an intent 217 from the possible intents 217.

For example, business logic rules 257 may filter or limit the outputs of the first tier of machine learning models 254 provided to the other machine learning model 254. For example, confidence score outputs from the first tier of machine learning models 254 may be compared to one or more thresholds. The business logic rules 257 may exclude as inputs to the other machine learning model 254 those outputs falling below the one or more thresholds. Moreover, the business logic rules 257 may define the thresholds to which an output is compared based on a current or previous workflow state 224, context data 229, or other criteria.

In further embodiments, the business logic rules 257 may select an intent 217 from the possible intents 217 according to the output of the first tier of machine learning models 254, thereby omitting or short-circuiting the application of the other tier of machine learning models 254. Following the example above discussing the filtering of outputs provided as input to the second tier machine learning model 254, the business logic rules 257 may indicate that an intent 217 should be selected if only its corresponding confidence score is output from the first tier of machine learning models 254. Thus, the second tier of machine learning models 254 is only applied if required to select an intent 217 from two or more possible intents filtered by the business logic rules 257. As another example, a business logic rule 257 may indicate that an intent 217 should be selected if the corresponding confidence score output from the first tier of machine learning models 254 meets or exceeds a threshold, independent of any other outputs from the other first tier machine learning models 254. As was described above, such thresholds may be defined according to other business logic rules 257 based on a previous or current workflow state 224, context data 229, or other data.

Data beyond the natural language input 214 may also serve as input to the machine learning models 254 to identify intents 217 or entities 221 from the natural language input 214. For example, assuming the user client 104 was associated with a workflow state 224 on input of the natural language input 214, the current or a previous workflow state 224 may serve as input to the machine learning models 254. In some embodiments, this may include accessing a last known workflow state 224 from an interaction history 248 in order to continue in a workflow from a previous session between the client 104 and the service agent 211. As another example, previously identified intents 217 or entities 221, as well as previously encountered workflow states 224 may be provided as inputs to the machine learning models 254, as a user of a client 104 may reference these data points in subsequent interactions with the service agent 211. Additionally, other context data 229 or other data may serve as input to the machine learning models 254. Other approaches may also be used to identify intents 217 or entities 221. After identifying the intents 217 or entities 221, the language processing service 107 may update the interaction history 248 to reflect the identification of these intents 217 or entities 221.

The language processing service 107 then provides the identified intents 217 or entities 221 to the workflow management service 111. The workflow management service 111 then initializes or updates a workflow state 224 to reflect a current state for a user of the user client 104 in a workflow. In some embodiments, this may include selecting a workflow state 224 as corresponding to a detected intent 217. In other embodiments, an intent 217 may potentially correspond to multiple workflow states 224. In such an embodiment, the workflow management service 111 may provide the detected intent 217, entities 221, or other data to a machine learning model 254 to determine a selected workflow state 224. Such other data may include context data 229, previous or current workflow states 224 or other data. For example, if the natural language input 214 is a first natural language input 214 for a session with the service agent 211, the workflow management service 111 may load a last accessed workflow state 224 from the interaction history 248 to determine whether to continue a previous workflow, or begin a new workflow.

The workflow management service 111 then defines the current workflow state 224 as the selected workflow state 224. This may include updating the interaction history 248 to reflect the transition to the selected workflow state 224. In some embodiments, the selected workflow state 224 may correspond to an action to be performed on transitioning to the workflow state 224. In some embodiments, this may include accessing data from the data store 114 corresponding to entities 221 identified by the language processing service 107. For example, if an entity 221 references an order placed by a user, the workflow management service 111 may load the referenced order from the order history 244 of a data store 114. This may include, for example, providing the detected entities 221 as a query to the data store 114, as inputs to an Application Program Interface (API), or performing other actions with respect to the entities 221. In other embodiments, this may include accessing an entry 241 in a knowledge base 237 corresponding to a reached workflow state 224.

The workflow management service 111 may also generate a response 227 to the user client 104 in response to transitioning to the selected workflow state 224. In some embodiments, the response 227 may include data accessed by the workflow management service 111 for presentation to the user client 104. For example, if the user client 104 is participating in a help or support workflow, the response 227 may include a knowledge base 237 entry 241 responsive to the needs of the user. In other embodiments, the workflow state 224 may indicate that additional information be provided in order to determine what actions should be performed or information should be provided to the user client 104. In such an embodiment, the response 227 may include a solicitation to provide a subsequent natural language input 214. In further embodiments, the response 227 may be generated based on a sentiment detected in the natural language input 214. For example, a response 227 may be shortened or summarized in response to a sentiment for urgency or terseness. The response 227 may also be generated according to a sentiment by another approach.

The response 227 provided to the user client 104 may be encoded as text, as audio, or in another form rendered by a client application 251 of the user client 104. The response 227 may be encoded in a similar format as the natural language input 214, or a different format. For example, if the natural language input 214 is obtained by a chat interface facilitated by the client application 251, the response 227 may be encoded as text rendered in the chat interface. As another example, if the natural language input 214 is obtained by a search or text input field to a network page, the response 227 may be encoded as a portion of a network page rendered by a browser client application 251. In another example, if the natural language input 214 is an audio input to a microphone or other sensor of the user client 104, the response 227 may be encoded as audio, text, or video rendered by the client application 251.

The service agent 211 continues to obtain natural language inputs 214 and provide responses 227 until the workflow reaches an ending workflow state 224, after which the user client 104 can enter another workflow if additional interaction is required. Indications of reached workflow states 224 are stored in the interaction history 248, allowing a client 104 to resume and persist workflow interactions across sessions with the service agent 211. This also allows these workflow interactions to be referenced in future natural language inputs 214. In some embodiments, the service agent 211 may deviate from a workflow and connect the user client 104 with a customer service representative or other agent in response to the natural language input 214. For example, the language processing service 107 may be configured to perform a sentiment analysis on the natural language input 214. In response to detecting frustration, anger, dissatisfaction, or another sentiment in the natural language input 214, the user client 104 may then be connected with a service client 205 associated with the customer service representative. The language processing service 107 may also update one or more of the machine learning models 254 to reflect that the user client 104 was transitioned to an undesired or unhelpful workflow state 224 based on the detected sentiment, thereby further training the machine learning models 254.

The machine learning models 254 may also be trained by another approach. For example, a chat interface facilitating communication between a user client 104 and a service client 205 accessed by a service representative may include inputs to select intents 217 and/or entities 221 by the service representative. The machine learning models 254 are then trained to reflect the natural language inputs 214 of the chat interface as corresponding to the selected intents 217 and/or entities 221.

Figure 3:
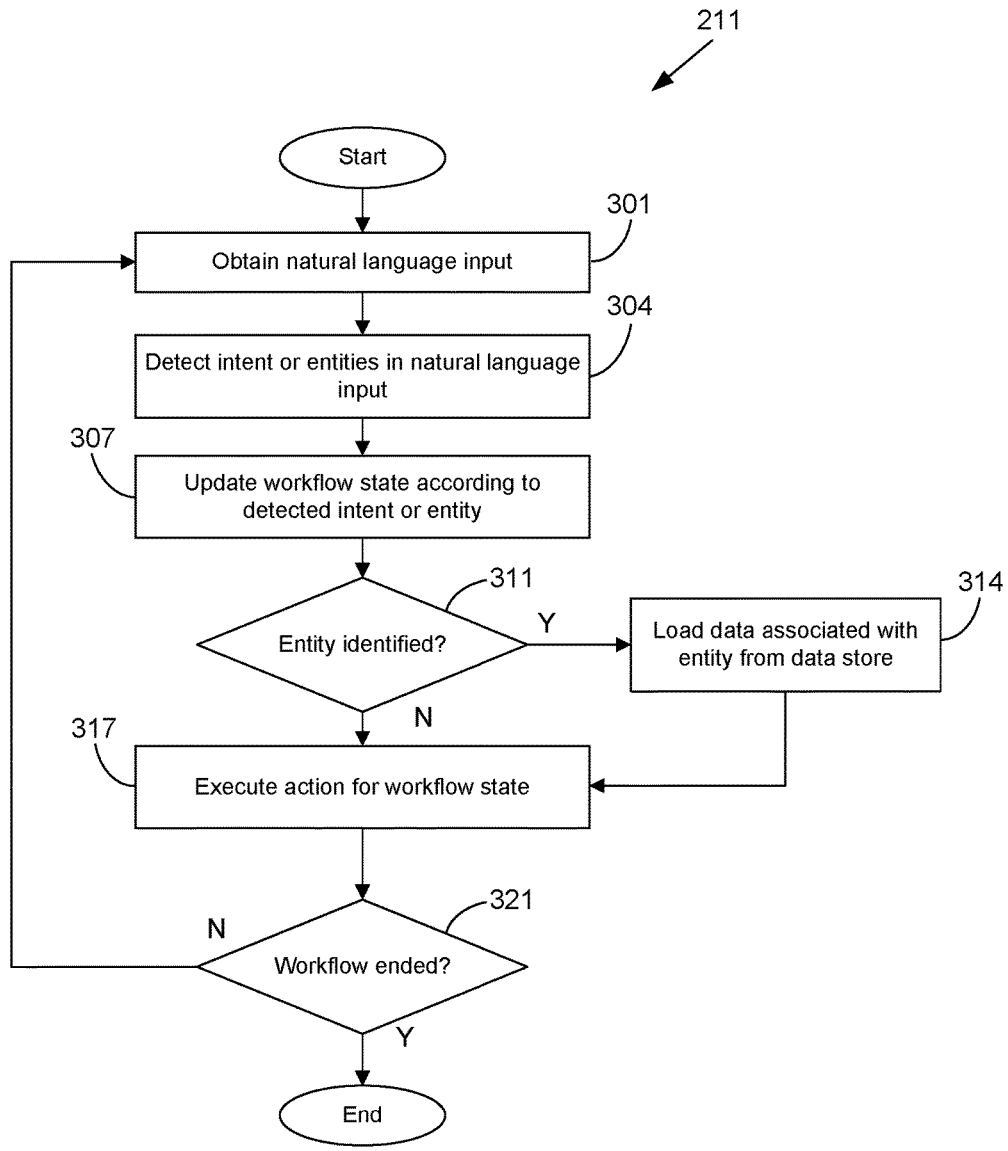
FIG. 3 is a flowchart illustrating one example of functionality implemented as portions of a service executed in a computing environment in the networked environment of FIG. 2 according to various embodiments of the present disclosure.

Referring next to FIG. 3, shown is a flowchart that provides one example of the operation of a portion of the service agent 211 according to various embodiments. It is understood that the flowchart of FIG. 3 provides merely an example of the many different types of functional arrangements that may be employed to implement the operation of the portion of the service agent 211 as described herein. As an alternative, the flowchart of FIG. 3 may be viewed as depicting an example of elements of a method implemented in the computing environment 200 (FIG. 2) according to one or more embodiments.

Beginning with box 301, the service agent 211 obtains a natural language input 214 (FIG. 2) from a user client 104 (FIG. 1) over the network 207 (FIG. 2). The natural language input 214 may include, for example, a text input to a chat interface or text input field of a user interface rendered by a client application 251 (FIG. 2). The natural language input 214 may also include an audio input to a microphone or other sensor of the user client 104. To this end, the language processing service 107 (FIG. 1) of the service agent 211 may apply a speech-to-text approach to the natural language input 214 to transform the natural language input 214 into a text or string format.

Next, in box 304, the language processing service 107 of the service agent 211 processes the natural language input 214 to detect intents 217 (FIG. 2) or entities 221 (FIG. 2) included or referenced in the natural language input 214. To this end, the language processing service 107 provides the natural language input 214 as input to one or more machine learning models 254 (FIG. 2) trained to identify intents 217 or entities 221.

In some embodiments, identifying intents 217 may be facilitated by implementing two tiers of machine learning models 254. For example, a first tier of machine learning models 254 may include multiple machine learning models 254, one for each possible predefined intent 217 that may be detected in the natural language input 214. The natural language input 214 may be provided to each of these machine learning models 254 to determine whether the corresponding possible intent 217 is reflected in the natural language input 214. Other data may also be provided to the machine learning models 254, including context data 229 (FIG. 2), current or previous workflow states 224 (FIG. 2) or other data.

The output of these machine learning models 254 may then be provided as input to another machine learning model 254 to select one or more intents 217 from the possible intents 217. The language processing service 107 may apply one or more business logic rules 257 (FIG. 2) to the outputs of the first tier of machine learning models 254 to facilitate selection of an intent 217 from the possible intents 217.

The workflow management service 111 then, in box 307, updates a workflow state 224 to reflect a current state for a user of the user client 104 in a workflow. In some embodiments, this may include selecting a workflow state 224 as corresponding to a detected intent 217. In other embodiments, an intent 217 may potentially correspond to multiple workflow states 224. In such an embodiment, the workflow management service 111 may provide the detected intent 217, entities 221, or other data to a machine learning model 254 to determine a selected workflow state 224. Such other data may include context data 229, previous or current workflow states 224, or other data.

Next, in box 311, the workflow management service 111 determines if an entity 221 was identified in box 307. If so, the process advances to box 314, where the workflow management service 111 loads data associated with the workflow management service 111 from the data store 114. This may include, for example, providing the identified entities 221 as a query to the data store 114, as inputs to an Application Program Interface (API), or performing other actions with respect to the entities 221. In other embodiments, this may include accessing an entry 241 in a knowledge base 237 corresponding to the updated workflow state 224. After loading the data in box 314, or if no entity 221 was identified as determined in box 311, the process advances to box 317 where an action is performed for the updated workflow state 224.

Performing an action for a workflow state 224 may include modifying or updating data accessed from the data store 114. Performing an action may also include generating a response 227 (FIG. 2) which is communicated to the user client 104. The response 227 may include a confirmation of an action performed by the workflow management service 111. The response 227 may also include a solicitation for additional natural language inputs 214, allowing for the advancement to another workflow state 224.

After performing the action for the workflow state 224, the service agent 211 determines if the workflow in which the user client 104 is participating has ended in box 321. In some embodiments, this includes determining if the current workflow state 224 is a terminal or ending workflow state 224. In other embodiments, this includes determining if the natural language input 214 includes a sentiment expressing frustration, displeasure, or another sentiment. This may be determined by a sentiment analysis performed by the language processing service 107 on the natural language input 214. Based on the detected sentiment, the user client 104 may be directed out of the workflow and connected with a service client 205 (FIG. 2), or another service.

If the workflow has ended, the process ends. Otherwise, the process returns to box 301 where additional natural language inputs 214 are obtained from the user client 104 for processing by the service agent 211.

Figure 4:
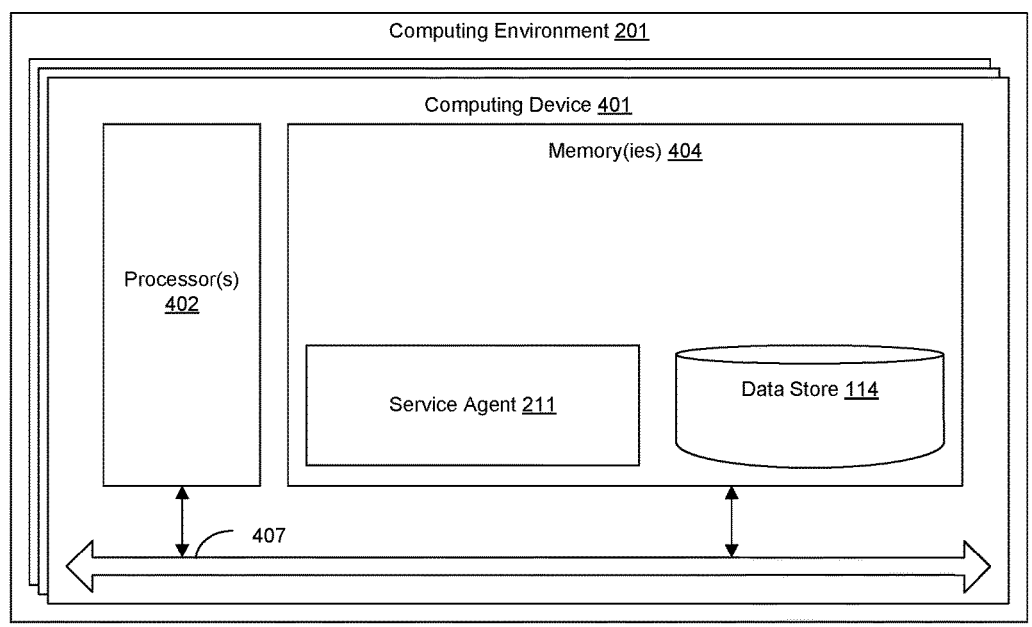
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 201 according to an embodiment of the present disclosure. The computing environment 201 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are a service agent 211, and potentially other applications. Also stored in the memory 404 may be a data store 114 and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), a hard drive, solid-state drive, USB flash drive, memory card, optical disc such as compact disc (CD) or digital versatile disc (DVD), floppy disk, magnetic tape, or other memory components as can be appreciated.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the service agent 211, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the service agent 211. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service agent 211, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the service agent 211, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 401, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear under- Therefore, the following is claimed:

1. A non-transitory computer-readable medium embodying a program executable in at least one computing device, the program, when executed by the at least one computing device, causes the at least one computing device to at least:
train a plurality of first machine learning models with a plurality of communications between a plurality of users and a plurality of service clients, each of the plurality of communications linked to an action implemented by at least one of the plurality of service clients;
train at least one second machine learning model to recognize an intended action of a user based at least in part on a set of selections of user intents by individual ones of a plurality of service representatives;
receive a natural language input from a client device;
provide the natural language input and context data associated with the client device to the trained plurality of first machine learning models to generate a plurality of outputs, each of the plurality of outputs corresponding to a respective one of a plurality of possible intents representing a possible intended action to be performed by the program;
select an intent for the natural language input from the plurality of possible intents based at least in part on an application of the at least one trained second machine learning model to the plurality of outputs of the plurality of trained first machine learning models and a plurality of business logic rules to the plurality of outputs of the plurality of trained first machine learning models, the intent representing an intended action to be performed by the program;
determine, based at least in part on the intent and the context data, a first state in a workflow progression;
change the workflow progression from the first state to a second state based at least in part on the intent and the context data; and
provide to the client device a response to the natural language input, wherein the response is based at least in part on the second state in the workflow progression.

2. The non-transitory computer-readable medium of claim 1, wherein the context data comprises at least one of an order history or a browse history corresponding to a user account associated with the client device.

3. The non-transitory computer-readable medium of claim 1, wherein the program, when executed, further causes the at least one computing device to at least:
determine at least one entity referenced by the natural language input;
load, from a data store, data corresponding to the at least one entity; and
perform at least one action on the data based at least in part on the intent or the change in the workflow progression from the first state to the second state.

4. The non-transitory computer-readable medium of claim 1, wherein the natural language input comprises an audio input.

5. The non-transitory computer-readable medium of claim 1, wherein the natural language input comprises a text input received via a chat interface.

6. A system, comprising:
at least one computing device, comprising a processor and a memory; and
machine readable instructions stored in the memory that, when executed by the processor, cause the at least one computing device to at least:
train a first machine learning model with a plurality of communications between a plurality of users and a plurality of service clients, each of the plurality of communications linked to an action implemented by at least one of the plurality of service clients;
train a second machine learning model to recognize an intended action of a user based at least in part on a set of selections of user intents by individual ones of a plurality of service representatives;
receive a natural language input from a client device;
provide the natural language input and context data associated with the client device to the trained first machine learning model to generate an output corresponding to a plurality of possible intended actions, wherein each of the plurality of possible intended actions of the user of the client device;
identify an intended action of the user from the plurality of possible intended actions based at least in part on an application of the trained second machine learning model to the output of the trained first machine learning model;
determine, based at least in part on the intended action of the user and the context data, a first state in a workflow progression for performance of the intended action;
update the workflow progression from the first state to a second state based at least in part on the intended action and the context data; and
provide to the client device a response to the natural language input, wherein the response is based at least in part on the second state in the workflow progression.

7. The system of claim 6, wherein the natural language input comprises a text input received via a chat interface, and providing the response comprises communicating the response to the client device for rendering in the chat interface.

8. The system of claim 6, wherein the natural language input comprises an audio input.

9. The system of claim 6, wherein the natural language input comprises a text input to a search input field, and providing the response comprises encoding for rendering by the client device a network page comprising the response.

10. The system of claim 6, wherein identification of the intended action is further based at least in part on a plurality of business logic rules to the output of the trained first machine learning model.

11. The system of claim 6, wherein the output comprises at least one of a respective confidence score or an indication of whether the natural language input corresponds to a corresponding one of the plurality of possible intended actions.

12. The system of claim 6, wherein the context data comprises at least one of an interaction history of the user of the client device with respect to the at least one computing device, an order history corresponding to a user account associated with the client device, or a browse history corresponding to the user account associated with the client device.

13. The system of claim 6, wherein the at least one computing device is further configured to at least:

determine at least one entity referenced by the natural language input; and load, from a data store, data corresponding to the at least one entity.

14. The system of claim 13, wherein the at least one computing device is further configured to at least perform an action based at least in part on the data corresponding to the at least one entity and a change in the workflow progression from the first state to the second state.

15. A method, comprising:

training, by at least one computing device, a plurality of first machine learning models with a plurality of communications between a plurality of users and a plurality of service clients, each of the plurality of communications linked to an action implemented by at least one of the plurality of service clients;

training, by the at least one computing device, at least one second machine learning model to recognize an intended action of a user based at least in part on a set of selections of user intents by individual ones of a plurality of service representatives;

determining, by the at least one computing device, an intent corresponding to a natural language input received via a client device by:

providing, by the at least one computing device, the natural language input and context data associated with the client device to the trained plurality of first machine learning models to generate a plurality of outputs, each of the plurality of outputs corresponding to a respective one of a plurality of possible intents; and selecting, by the at least one computing device, the intent from the plurality of possible intents based at least in part on an application of the trained at least one second machine learning model to the plurality of outputs of the trained first plurality of machine learning models and at least one predefined rule to the plurality of outputs of the trained first plurality of machine learning models;

determining, by the at least one computing device, a first state in a workflow progression based at least in part on the intent and the context data;

changing, by the at least one computing device, the workflow progression from the first state to a second state based at least in part on the intent and the context data; and providing, by the at least one computing device, a response to the natural language input to the client device, wherein the response is based at least in part on the second state in the workflow progression.

16. The method of claim 15, wherein the natural language input is a first natural language input, and the method further comprises detecting, by the at least one computing device, a sentiment in a second natural language input obtained via the client device after providing the response.

17. The method of claim 16, further comprising facilitating, by the at least one computing device, a communication between the client device and a customer service agent based at least in part on the sentiment.

18. The method of claim 16, further comprising updating, by the at least one computing device, at least one of the plurality of trained first machine learning models or the trained second machine learning model based at least in part on the sentiment.

19. The method of claim 16, further comprising generating, by the at least one computing device, a second response to the second natural language input based at least in part on the sentiment.

20. The method of claim 15, wherein the at least one predefined rule restricts the plurality of outputs provided as inputs to the second machine learning model based at least in part on a current state in the workflow progression, the context data, or a comparison of the plurality of outputs to at least one threshold.

* * * * *